(12) United States Patent
Suzuki

(10) Patent No.: US 7,063,482 B2
(45) Date of Patent: Jun. 20, 2006

(54) CRACK-PREVENTIVE SCREW-FASTENING STRUCTURE FOR RESINOUS HOUSING

(75) Inventor: Yasuhiro Suzuki, Kariya (JP)

(73) Assignee: Denso Corporation (JP)

( * ) Notice: Subject to any disclaimer, the term of this patent is extended or adjusted under 35 U.S.C. 154(b) by 55 days.

(21) Appl. No.: 10/674,501

(22) Filed: Oct. 1, 2003

(65) Prior Publication Data
US 2004/0062595 A1    Apr. 1, 2004

(30) Foreign Application Priority Data
Oct. 1, 2002    (JP)    ............................. 2002-288262

(51) Int. Cl.
*F16B 37/04*    (2006.01)
(52) U.S. Cl. .................... 403/268; 411/82.1; 411/256; 411/930
(58) Field of Classification Search ............... 411/82.1, 411/82.2, 82.3, 258, 930; 403/299, 267, 403/268
See application file for complete search history.

(56) References Cited

U.S. PATENT DOCUMENTS

| 4,832,551 A | * | 5/1989 | Wollar | 411/280 |
| 4,906,152 A | * | 3/1990 | Kurihara | 411/182 |
| 5,106,225 A | * | 4/1992 | Andre et al. | 403/408.1 |
| 5,356,254 A | * | 10/1994 | DiMaio et al. | 411/903 X |
| 5,885,041 A | * | 3/1999 | Giannuzzi et al. | 411/82 |
| 6,582,172 B1 | * | 6/2003 | Nickerson et al. | 411/371.1 |
| 6,588,999 B1 | * | 7/2003 | Kubler et al. | 411/82.1 |
| 2004/0089931 A1 | * | 5/2004 | Nakajima et al. | 257/684 |

FOREIGN PATENT DOCUMENTS

| JP | 57-139659 | 8/1982 |
| JP | 61-171911 | 8/1986 |
| JP | 62-147709 | 7/1987 |
| JP | 10-205359 | 8/1998 |
| JP | 2002-70824 | 3/2002 |

* cited by examiner

*Primary Examiner*—John R. Cottingham
(74) *Attorney, Agent, or Firm*—Nixon & Vanderhye PC

(57) ABSTRACT

An adhesive is applied to a male-threaded portion of a tapping screw. The male-threaded portion with the adhesive is threadably engaged with a non-threaded through hole of the full-closed stopper with female-threads being formed on the surface of the though hole. In this case, the adhesive functions as lubricant between the inner surface of the through hole and the male-threaded portion. Accordingly, the male-threaded portion can be screwed into the through hole with a low torque and without applying high load to the full-close stopper. Therefore, the full-close stopper is prevented from being projected around the inlet and the outlet of the through hole, and the full-close stopper is prevented from being cracked.

15 Claims, 10 Drawing Sheets

US 7,063,482 B2

CRACK-PREVENTIVE SCREW-FASTENING STRUCTURE FOR RESINOUS HOUSING

CROSS REFERENCE TO RELATED APPLICATION

This application is based on Japanese Patent Application No. 2002-288262 filed on Oct. 1, 2002, the disclosure of which is incorporated herein by reference.

FIELD OF THE INVENTION

The present invention relates to a screw and a housing having a resinous portion provided with a crack-preventive screw-fastening structure, which can prevent the resinous portion from being cracked when the screw is engaged with resinous portion.

BACKGROUND OF THE INVENTION

In a conventional throttle valve system of an internal combustion engine, a throttle shaft is disposed in an air intake passage, which is formed inside of a cylindrical bore portion of a throttle housing. Moreover, a throttle valve for controlling the amount of intake air is rotatably attached to the throttle shaft. A full-close stopper is provided on an external wall of the bore portion. When an accelerator pedal is released, the throttle valve is fully closed by biasing force of a return spring. Then, an acceleration lever, which is connected with one end of the throttle valve, contacts the full close stopper. The full-close stopper includes a valve-position adjustment screw for adjusting a fully closed position of the throttle valve.

Such the throttle valve system is, for example, described in a patent document of JP-A-H10-205359. In this throttle valve system, for lightening its body, the throttle housing and the throttle valve are made of a composite material the main component of which is a synthetic resin. It is considered to employ a tapping screw fastening structure shown in FIGS. 14A and 14B. In this structure, a tapping screw 101 is used as the valve-position adjustment screw. A full-close stopper 102 to be screwed with the tapping screw 101 is formed on a bore portion of a throttle housing, which is made, for example, of a heat-resisting resin. The full close stopper 102 has a non-threaded hole 103 to be engaged with a male-threaded portion 105 of the tapping screw 101. The diameter of the non-threaded hole 103 is smaller than outer diameter of the male-threaded portion 105. Therefore, while the tapping screw 101 is screwed into the full-close stopper 102 so that the male-threaded portion 105 should be engaged with the non-threaded hole 103, very high fastening torque is applied to the tapping screw 101.

Accordingly, around the inlet of the non-threaded hole 103, some parts of the full-close stopper 102 projects as shown in FIG. 14B. Moreover, when the tapping screw 101 is further screwed into the full-close stopper portion 102, those projected parts are forcedly pressed by a screw head 104. Therefore, the full-close stopper 102 is likely to be cracked. Usually, the acceleration lever applies a high load to the tapping screw 101. Thus, when the throttle valve system is used for a long time, the full-close stopper 102 will be notable to support the tapping screw 101 stably. Consequently, valve position adjusting performance is disadvantageously lowered.

SUMMARY OF THE INVENTION

In view of the above problems, the purpose of the present invention is to provide a screw fastening structure that can prevent a resinous portion of a housing from being cracked when a screw is screwed into the resinous portion and moreover provide a housing with which a screw can be threadably engaged with a low torque.

According to the present invention, a screw fastening structure includes a tapping screw and a throttle housing. The tapping screw has a male-threaded portion, and the throttle housing has a resinous full-close stopper. The male-threaded portion is threadably engage with the full-close stopper. Moreover, an adhesive is permeated between the male-threaded portion and the full-close stopper. Since the adhesive functions as lubrication therebetween, the male-threaded portion can be screwed into the full-close stopper with a low torque. Therefore, a load applied by the male-threaded portion is lowered, and thereby the full-close stopper is prevented from being projected around the inlet and the outlet of the through hole, and the full-close stopper is prevented from being cracked. Moreover, after the adhesive is hardened, the tapping screw is prevented from being loosened.

Moreover, according to the present invention, a screw fastening structure includes a tapping screw and a throttle housing. The tapping screw has a male-threaded portion and a screw head, which is positioned at an end of the tapping screw in opposition to the engaging side of the screw tapping screw. The throttle housing includes a resinous full-close stopper to be threadably engaged with the male-threaded portion. The full-close stopper has a round through hole for guiding the male-threaded portion to be engaged with the through hole. The through hole has a clearance inlet hole around its inlet, and the inner diameter of the clearance inlet hole is larger than the outer diameter of the male-threaded portion. Accordingly, the fastening load of the tapping screw does not concentrate on the inlet of the through hole, and thereby the full-close stopper is prevented from being projected around the inlet. Therefore, the full-close stopper is prevented from being cracked.

Further, according to the present invention, a screw fastening structure includes a tapping screw and a throttle housing. The tapping screw has a male-threaded portion and a screw head, which is positioned at an end of the tapping screw in opposition to an engaging side of the tapping screw. The throttle housing includes a resinous full-close stopper to be threadably engaged with the male-threaded portion. The length of the male-threaded portion is shorter than the length of the through hole so that the male-threaded portion should not be projected from the outlet of the through hole when engaged therewith. Accordingly, the fastening load of the tapping screw is not applied to the outlet of the through hole, and thereby the full-close stopper is prevented from being projected around the outlet. Therefore, the full-close stopper is prevented from being cracked.

Furthermore, according to the present invention, a screw fastening structure includes a screw having a male-threaded portion and a throttle housing. The housing includes a resinous full-close stopper to be threadably engaged with the male-threaded portion. The full-close stopper has a round through hole for guiding the male-threaded portion to be engaged therewith. The through hole has a clearance outlet hole around its outlet for preventing the male-threaded portion from contacting the full-close stopper. Accordingly, the fastening load of the tapping screw does not concentrate on the outlet of the through hole, and thereby the full-close stopper is prevented from being projected around the outlet. Therefore, the full-close stopper is prevented from being cracked.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PRESENTLY PREFERRED EMBODIMENTS

Figure 1A:
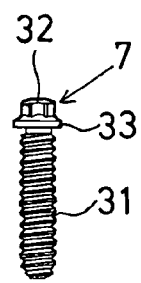
FIG. 1A is a front elevational view of a tapping screw according to a first embodiment of the present invention.

Embodiments of the present invention will be described in detail with reference to the accompanying drawings.

First Embodiment

In a throttle valve system applied with a screw fastening structure according to this embodiment, rotational speed of an engine is controlled by controlling the amount of air drawn into the engine on the basis of stepping degree of an accelerator pedal (not shown). The throttle valve system has a throttle valve 1, a throttle shaft 2, a throttle lever 3 and a throttle housing 5. The throttle valve 1 controls the amount of air drawn into the engine. The throttle shaft 2 is rotated integrally with the throttle valve 1. The throttle lever 3 rotationally drives the throttle valve 1 and the throttle shaft 2. The throttle housing 5 includes a bore portion 4 having a substantially cylindrical shape, and the throttle valve 1 and the throttle shaft 2 are rotatably disposed inside the bore portion 4.

The throttle valve 1 is a butterfly-shaped rotary valve, which is made of a metal or resin and moreover has a disc-shape. Moreover, the throttle valve 1 is inserted in a valve insertion groove (not shown) formed in the throttle shaft 2 and fastened there through the use of fastening members 11 (e.g., setscrews). The shaft 2 is made of metal or resin and has a pole-shape. Moreover, the shaft 2 is supported by bearing portions (not shown) or shaft penetration holes (not shown) of the throttle housing 5 rotatably by means of a bearing system (e.g., thrust bearings, dry bearings, ball bearings, etc.).

The throttle lever 3 is made of metal or resin and fastened to one end of the shaft 2 through the use of a fastening members 12 (e.g., a bolt and a washer). A substantially v-shaped V-portion 13 of the throttle lever 3 is driven in accordance with the depressed degree of the accelerator pedal through a wire (not shown). Moreover, a bossy full-open stopper portion 14 and a bossy full-close stopper portion 15 are integrally formed on the side wall of the throttle lever 3, the side wall opposing the bore portion 4. The full-open stopper portion 14 and the full-close stopper portion 15 are respectively for stopping a full-open stopper 23 and a full-close stopper 24. Moreover, a plurality of stiffening ribs 16 for stiffening the throttle lever 13 are formed on both side walls thereof.

Moreover, a coil-shaped return spring 6 is installed between the throttle lever 3 and the throttle housing 5. One end of the return spring 6 is fastened to the throttle lever 3, and the other end thereof is fastened to the outer wall of the bore portion 4. While the engine is driven at idle rotational speed, the return spring 6 returns the throttle valve 1, the throttle shaft 2 and the throttle lever 3 into their respective initial positions.

The throttle housing 5 is a resin-molding product integrally made of heat-resistant resin. The throttle housing 5 supports the throttle valve 1 and the throttle shaft 2. An attachment flange 17 is formed integrally with the throttle housing 5. For details, the attachment flange 17 is disposed at a downstream end of the bore portion 4 in the flowing direction of intake air. The attachment flange 17 is airtightly fastened to an attachment surface of an intake manifold (not shown) of the engine through the use of fastening members (not shown), e.g., bolts, nuts, etc. Moreover, the attachment flange 17 has through holes 19, through which the fastening members are screwed into female-threaded portions of the intake manifold. The heat-resistant resin, forming the throttle housing 5 integrally, is a thermoplastic resin, e.g., PPS (polyphenylene sulfide) or PBT (polybutene terephthalate).

The bore portion 4 has substantially uniform outer and inner diameters in the flowing direction and has an air passage in its inside, through which the intake air is drawn into the engine. In the middle of the air passage, the throttle valve 1 and the throttle shaft 2 are rotatably installed. Moreover, in the air passage, there are an air outlet (not shown) and an air inlet (not shown). Through the air inlet, the air is drawn from an air cleaner (not shown) into the air passage through an inlet pipe (not shown). Through the air outlet, the air is drawn from the air passage into a surging tank (not shown) or the intake manifold of the engine.

Figure 1B:
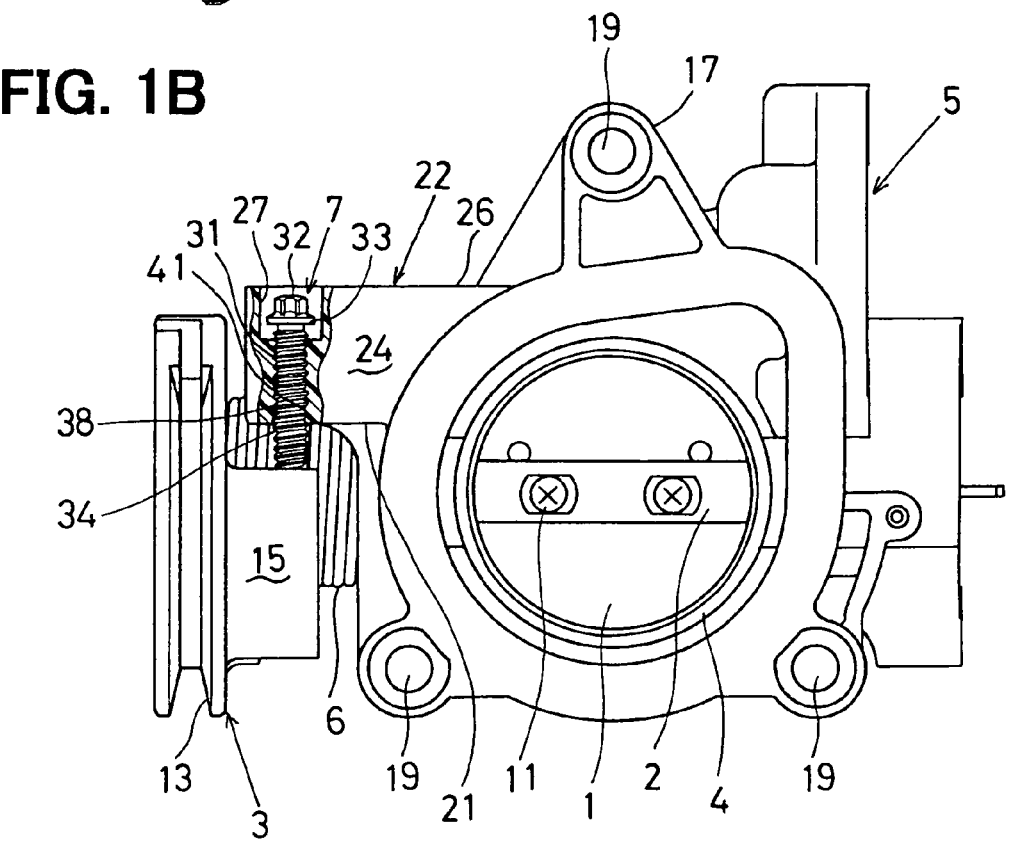
FIG. 1B is a front elevational view of a throttle valve system according to the first embodiment of the present invention.
Figure 2:
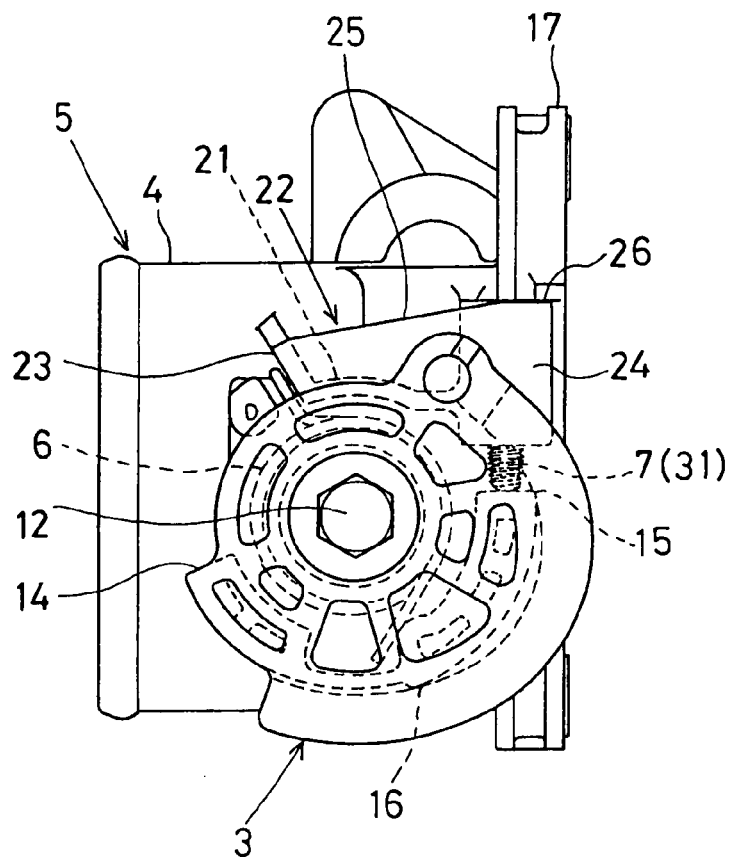
FIG. 2 is a side elevational view of the throttle valve system according to the first embodiment of the present invention.
Figure 3:
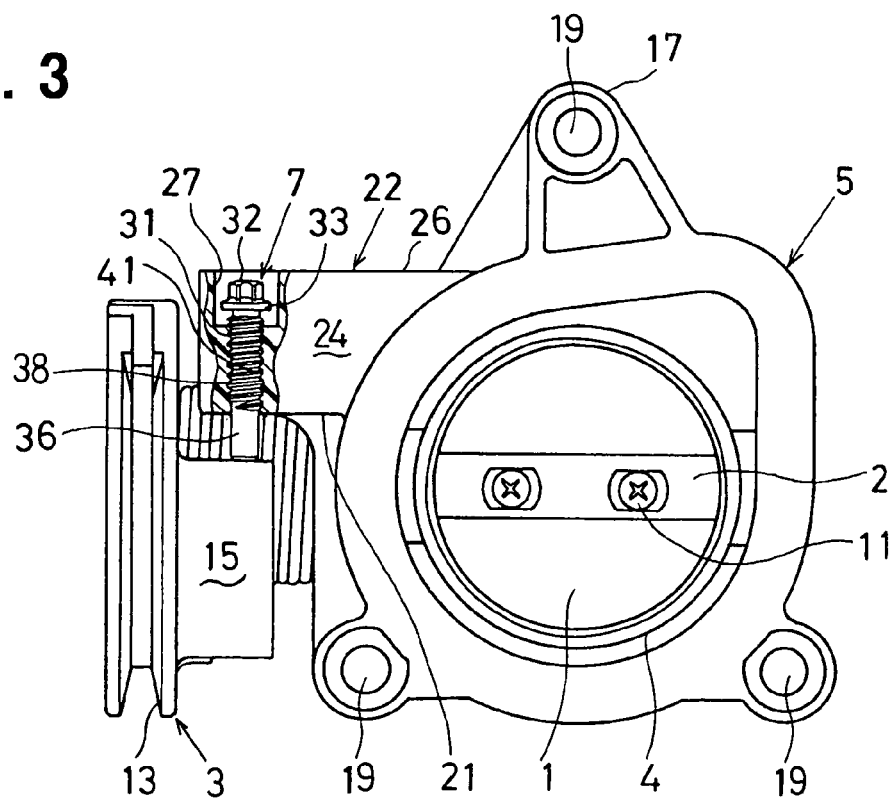
FIG. 3 is a front elevational view of a throttle valve system according to a second embodiment of the present invention.
Figure 4:
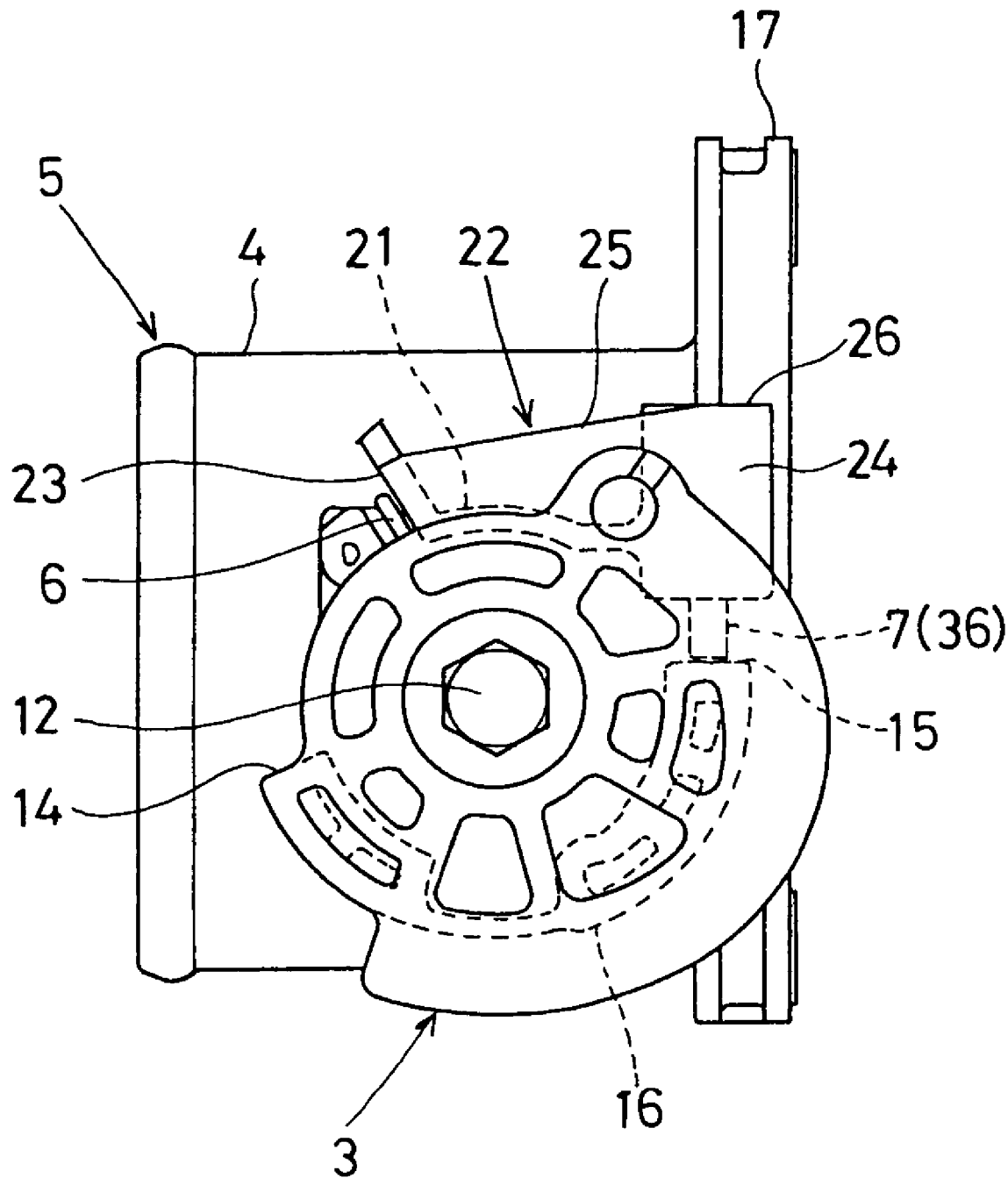
FIG. 4 is a side elevational view of the throttle valve system according to the second embodiment of the present invention.

Moreover, on the throttle housing 5 and at the left side of the bore portion 4 in FIG. 1B, a substantially arcuate projecting wall 21 and an integrally boss-shaped portion 22 are integrally formed. They are made of heat-resistant resin. The projecting wall 21 partially covers one end portion of the shaft 2. The projecting portion 22 projects from the outer surface of the projecting wall 21 in an outer radial direction thereof.

The projecting portion 22 has a full-open stopper 23 and a full-close stopper 24. When the throttle valve 1 is fully opened, the full-open stopper 23 contacts the full-open stopper portion 14 of the throttle lever 3, and thereby the further rotation of the throttle lever 3 is prevented, that is, the throttle valve 1 and the throttle shaft 2 are stopped in their fully opened positions. Moreover, when the throttle valve 1 is fully closed, the full-close stopper 24 contacts the full-close stopper portion 15 of the throttle lever 3, and thereby the further rotation of the throttle lever 3 is prevented, that is, the throttle valve 1 and the throttle shaft 2 are stopped in their fully closed positions. In addition, a stiffening rib 25 for stiffening the full-open stopper 23 and a stiffening rib 26 for stiffening the full-close stopper 24 are integrally formed in the projecting portion 22.

A round through hole 38 is formed in the full-close stopper 24. In the through hole 38, a tapping screw 7 is screwed. The fully closed position of the throttle valve 1 is adjsuted in accordance with the position of the tapping screw 7 disposed inside the through hole 38. Moreover, a round hollow 27 is formed around the inlet of the through hole 38. The inner diameter of the round hollow 27 is larger than that of the through hole 38. Accordingly, while the tapping screw 7 is screwed into the through hole 38, the full-close stopper 24 is not damaged by a fastening tool around the inlet of the through hole 38.

As shown in FIG. 1A, the tapping screw 7 has a male-threaded portion 31, a screw head 32 and a head flange 33. The male-threaded portion 31 makes female threads on the inside surface of the through hole 38 when threaded thereinto. The head flange 33 is positioned at a lower part of the screw head 32. Male threads are uniformly formed on the surface of the male-threaded portion 31 from its lower end toward the head flange 33.

Before the tapping screw 7 is screwed into the through hole 38, the male-threaded portion 31 is coated with an adhesive 34 (e.g., an anaerobic adhesive, a two-liquid type adhesive, etc.) for keeping the lubricity. Before the adhesive 34 is hardened, the tapping screw 7 is screwed into the through hole 38.

Accordingly, while the male-threaded portion 31 of the tapping screw 7 is screwed into the through hole 38, the non-hardened adhesive 34 is spread between the male-threaded portion 31 and the inner surface of the through hole 38, and thereby the contact resistant therebetween can be lowered. Therefore, the tapping screw 7 can be screwed into the through hole 38 with low fastening torque with the axis of the tapping screw 7 and that of the through hole 38 being corresponded. Moreover, while the male-threaded portion 31 of the tapping screw 7 is screwed into the through hole 38, the female threads 41 can be surely formed on the inside surface of the through hole 38 with a low fastening torque.

Moreover, it is prevented that some parts of the full-close stopper 24 are projected around the inlet and the outlet of the through hole 38 (see FIG. 14B) while the tapping screw 7 is screwed into the through hole 38. Since the parts of the full-close stopper 24 are not projected around the inlet of the through hole 38, the bottom surface of the round hollow 27 (i.e., around the inlet of the through hole 38) is not forcedly pressed by the head flange 33, and thereby the full-close stopper 24 is prevented from being cracked by the head flange 33. Therefore, when the throttle valve system is used for a long time, the full-close stopper 24 can securely support the male-threaded portion 31 of the tapping screw 7, and the adjusting performance of the throttle valve 1 in its fully closed position would not be lowered. Further, after the adhesive 34 is hardened, the taping screw 7 is prevented from being loosed inside the through hole 38. In comparison with ordinary lubricant (e.g., lubricating oil, machine oil, etc.), the adhesive has an another effect that the tapping screw 7 is hard to be loosened after the tapping screw 7 has been fastened inside the through hole 38.

Otherwise, the adhesive 34 may be applied to the inner surface of through hole 38 before the tapping screw 7 is screwed thereinto. The above effect can be also achieved in this way.

Second Embodiment

In the second and the latter embodiments, components similar to those described in the first embodiment will be indicated by the similar numerals, and thus will not be described farther.

Figure 5A:
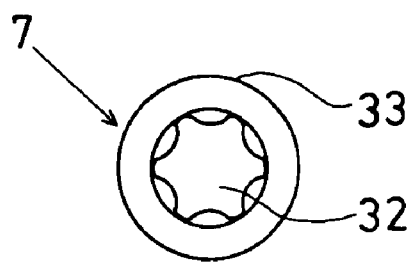
FIG. 5A is a top view of a tapping screw according to the second embodiment of the present invention.
Figure 5B:
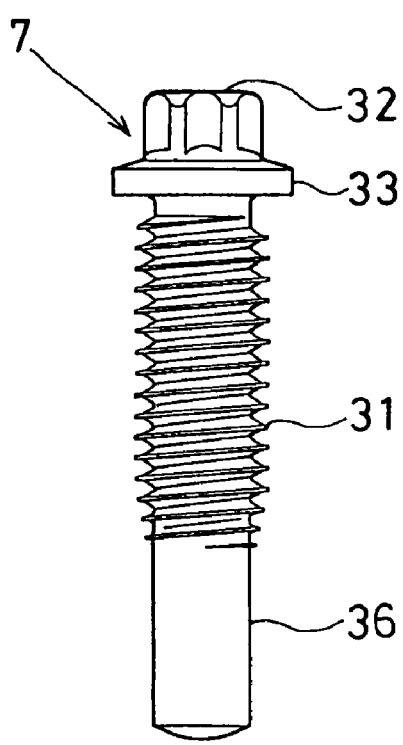
FIG. 5B is a front elevational view of the tapping screw according to the second embodiment of the present invention.
Figure 5C:
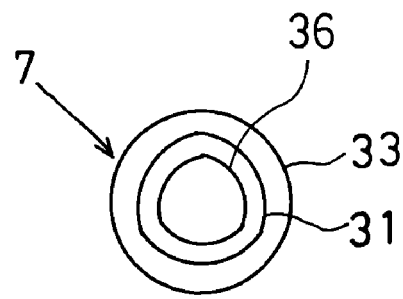
FIG. 5C is a bottom view of the tapping screw according to the second embodiment of the present invention.

The screw fastening structure of this embodiment will be described with reference to FIGS. 3, 4, 5A-5C and 6. As shown in FIG. 5B, a tapping screw 7 according to this embodiment has a male-threaded portion 31, a screw head 32, a head flange 33 and a non-threaded portion 36. Moreover, the male-threaded portion 31 has a non-circular shape (a substantially triangular shape) in its cross-section. The non-threaded portion 36 has no male threads and has a non-circular shape (a substantially triangular shape) in its cross-section. A full close stopper 24 has a through hole 38 to be threadably engaged with the tapping screw 7. The diameter of a through hole 38 is larger than the circumscribing circle of the non-threaded portion 36 in its cross-section and smaller than that of the male-threaded portion 31 in its cross-section. With respect to the positions of the portions 31, 36, when the tapping screw 7 has been screwed into the through hole 38, the male-threaded portion 31 is substantially disposed inside through hole 38, and only the non-threaded portion 36 is projected from the outlet of the through hole 38.

An adhesive 34 is applied to the male-threaded portion 31 before the tapping screw 7 is screwed into the through hole 38. Accordingly, while the tapping screw 7 is screwed into the through hole 38 with female threads 41 being formed on the inner surface of the through hole 38, the adhesive 34 is spread between the male-threaded portion 31 and the inner surface of the through hole 38, i.e., between the male-threaded portion 31 and the female threads 41. Therefore, the lubricating performance therebetween is enhanced so that the full-close stopper should not be forcedly stressed, and thereby the full-open stopper 24 is prevented from being cracked.

Figure 6:
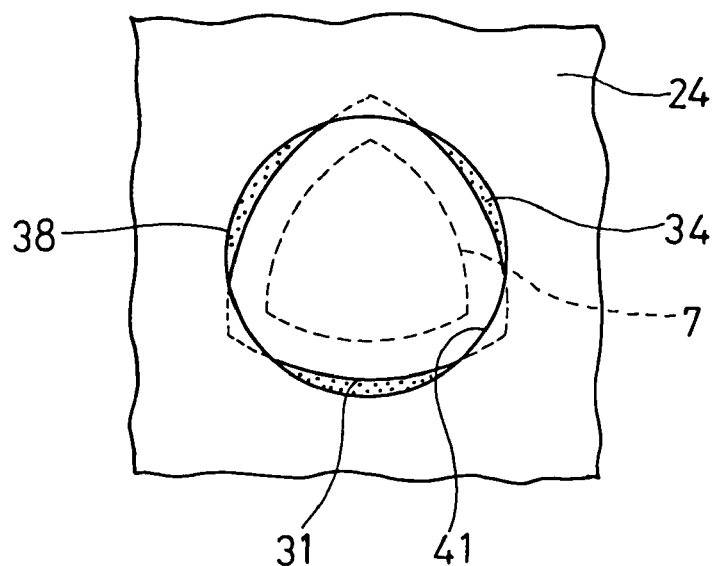
FIG. 6 is a schematic diagram illustrating a fastening structure of the tapping screw engaged with a through hole according to the second embodiment of the present invention.

Furthermore, in this embodiment, the male-threaded portion 31 has a substantially triangular shape in its cross-section. Therefore, as shown in FIG. 6, the adhesive 34 spread enough between the male-threaded portion 31 and the inner surface of the through hole 38. Accordingly, the higher lubricating performance therebetween can be achieved while the tapping screw 7 is screwed into the through hole 38. Moreover, after the adhesive 34 has been hardened, the adhesive 34 can support the male-threaded portion 31 and the more securely inside the through hole 38.

Otherwise, the adhesive 34 may be applied to the inner surface of the through hole 38 in place of the male-threaded portion 31 before the tapping screw 7 is screwed into the through hole 38. In this case, the similar effect can be achieved.

Third Embodiment

Figure 7:
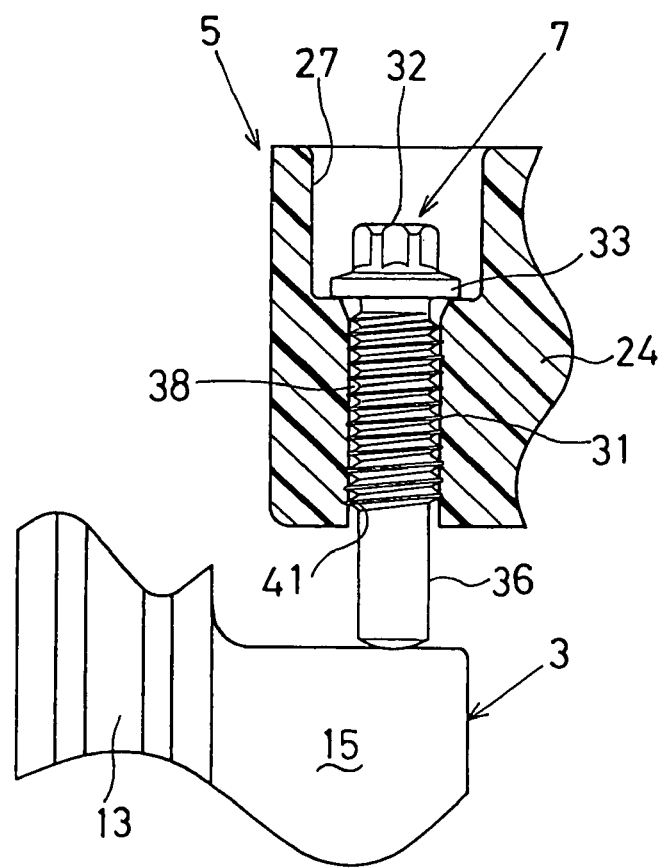
FIG. 7 is a first schematic diagram illustrating a screw fastening structure between a tapping screw and a full-close stopper according to a third embodiment of the present invention.

The screw fastening structure of this embodiment will be described with reference to FIGS. 7, 8A, 8B and 9. As shown in FIG. 7, a male-threaded portion 31 is formed to be shortly extended from the head flange 33 toward the lower end of the tapping screw 7. With respect to the length of the male-threaded portion 31 in its axial direction, the male-threaded portion 31 does not project from the outlet of the through hole 38 when the tapping screw 7 has been fully screwed into the through hole 38. As shown in FIG. 9, in case where the male-threaded portion 31 is projected from the outlet of the through hole 38, the outlet is forcedly pressed by the male-threaded portion 31 in any radial directions thereof, and thereby the outlet is likely to be cracked. However, in this embodiment, since the male-threaded portion 31 is not projected from the outlet, the outlet of the through hole 38 is prevented from being cracked.

Figure 8A:
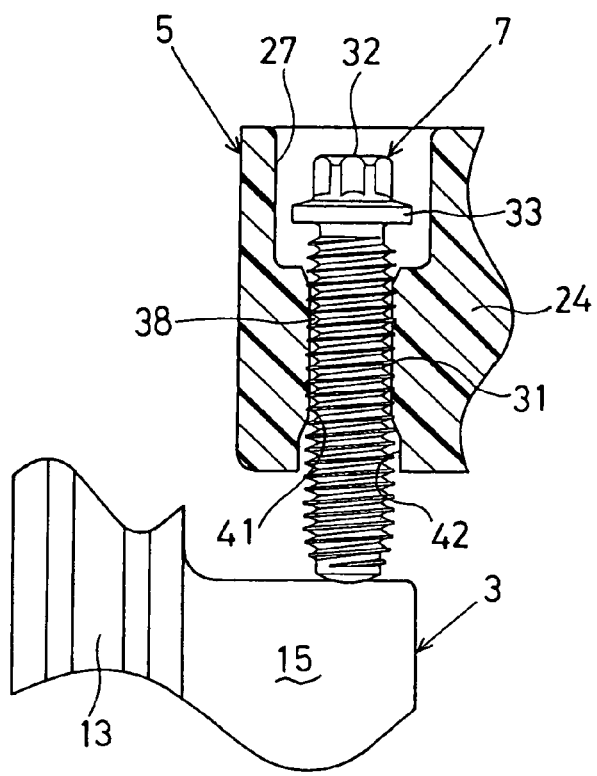
FIGS. 8A and 8B are respectively a second and a third schematic diagrams illustrating screw fastening structures between a tapping screw and a full-close stopper according to the third embodiment of the present invention.
Figure 8B:
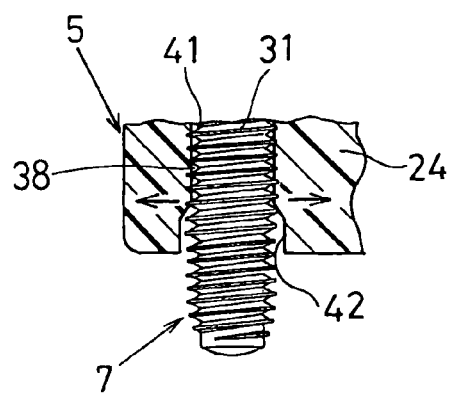
Figure 9:
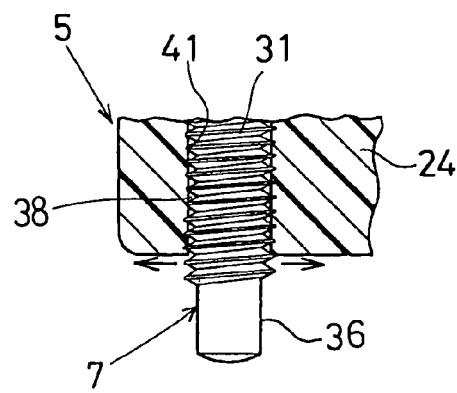
FIG. 9 is a schematic diagram illustrating a screw fastening structure between a tapping screw and a full-close stopper according a related art.
Figure 10:
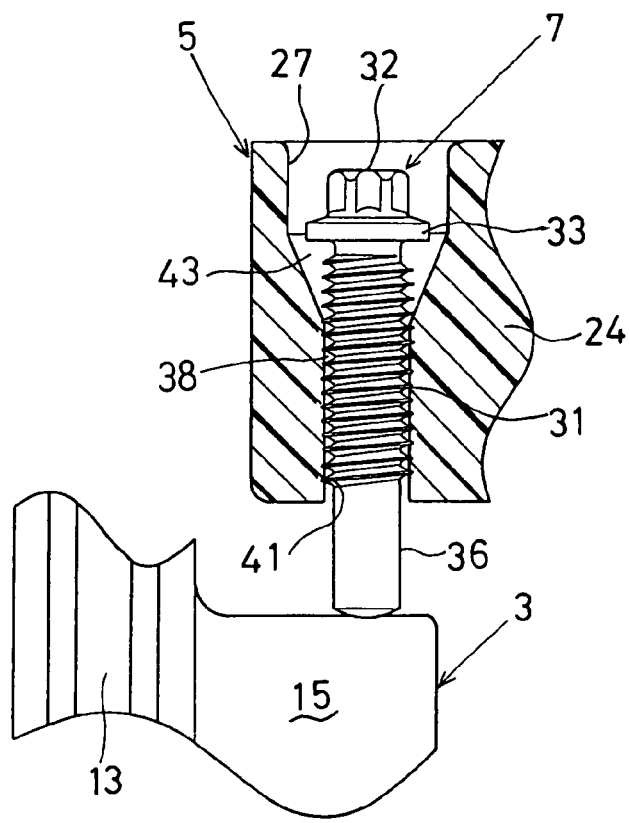
FIG. 10 is a schematic diagram illustrating a screw fastening structure between a tapping screw and a full-close stopper according to a fourth embodiment of the present invention.

Otherwise, as shown in FIGS. 8A and 8B, a clearance outlet hole 42 is formed around the outlet of the through hole 38. The inner diameter of the clearance outlet hole 42 is larger than the outer diameter of the male-threaded portion 31. Therefore, even though the tapping screw 7 is screwed into the through hole 38, and a part of the male-threaded portion 31 is positioned in the clearance outlet hole 42, the male threaded portion 31 does not contact the inner surface of the clearance outlet hole 42. In this case, as shown in FIG. 8B, around the boundary between the through hole 38 and the clearance hole 42, the full-close stopper 24 is forcedly pressed by the male-threaded portion 31 in any radial directions thereof. The boundary is positioned in an inner part of the full-close stopper 24, and therefore the stress does not concentrate on a particular part of the full-close stopper 24. That is, it is prevented that the outlet of the through hole 38 is cracked.

Moreover, in place of the clearance outlet hole 42, the peripheral edge of the outlet may be chamfered.

Fourth Embodiment

In this embodiment, a clearance inlet hole 43 is formed around the inlet of the through hole 38. The clearance inlet hole 43 has a tapering shape. In details, the inner diameter of the clearance inlet hole 43 around its inlet is as large as that of the round hollow 5, and the inner diameter becomes smaller in the screwing direction of the tapping screw 7.

Figure 14A:
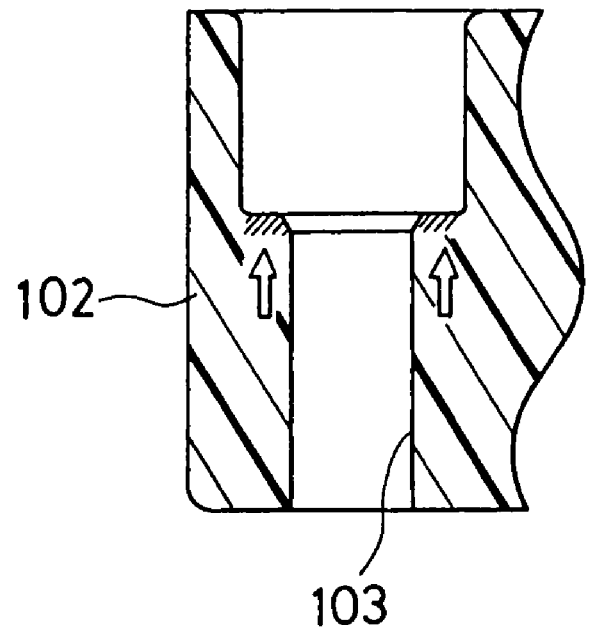
FIGS. 14A and 14B are schematic diagrams illustrating fastening structures between a tapping screw and a full-close stopper according to a related art.
Figure 14B:
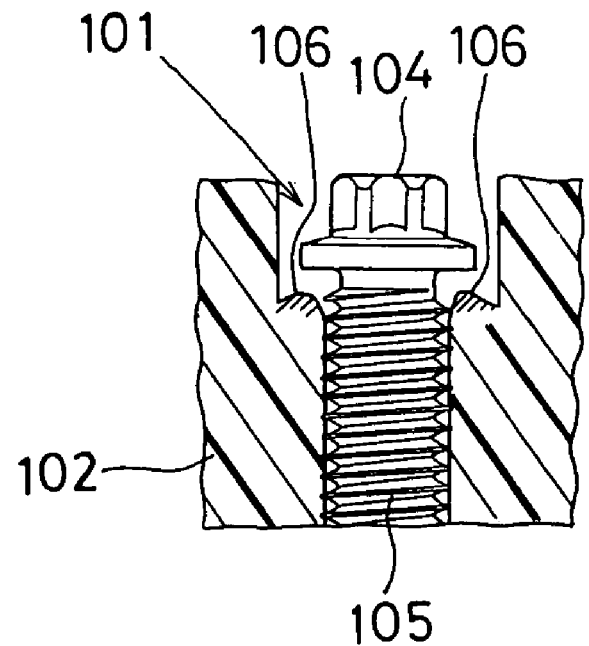

Accordingly, the inlet of the through hole 38 is prevented from being projected as shown in FIG. 14B while the tapping screw 7 is screwed into the through hole 38. In addition, it is prevented that the head flange 33 forcedly presses the inlet of the through hole 38. Therefore, the full-close stopper 24 is prevented from being cracked around the inlet of the through hole 38.

Moreover, in place of such the clearance inlet hole 43, the peripheral edge of the outlet may be chamfered. This structure can also achieve the same effect.

Fifth Embodiment

Figure 11:
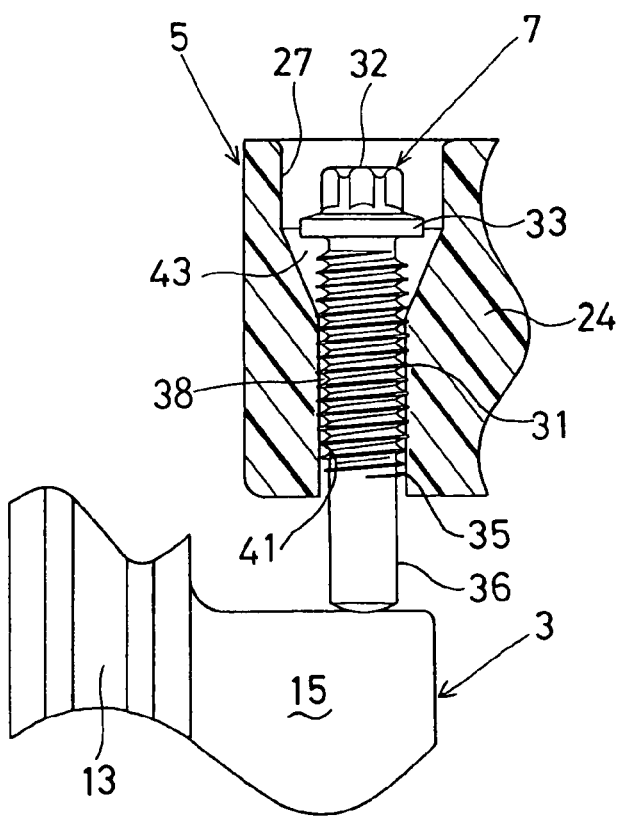
FIG. 11 is a schematic diagram illustrating a screw fastening structure between a tapping screw and a full-close stopper according to a fifth embodiment of the present invention.

In this embodiment shown in FIG. 11, in addition to the tapering inlet hole 43, tapering male threads 35 are formed on the lower part of the male-threaded portion 31. The outer diameter of the tapering male threads 35 becomes smaller in the screwing direction of the tapping screw 7. In this case, the inlet of the through hole 38 is prevented from being cracked more effectively while the tapping screw 7 is screwed into the through hole 38.

Sixth Embodiment

Figure 12:
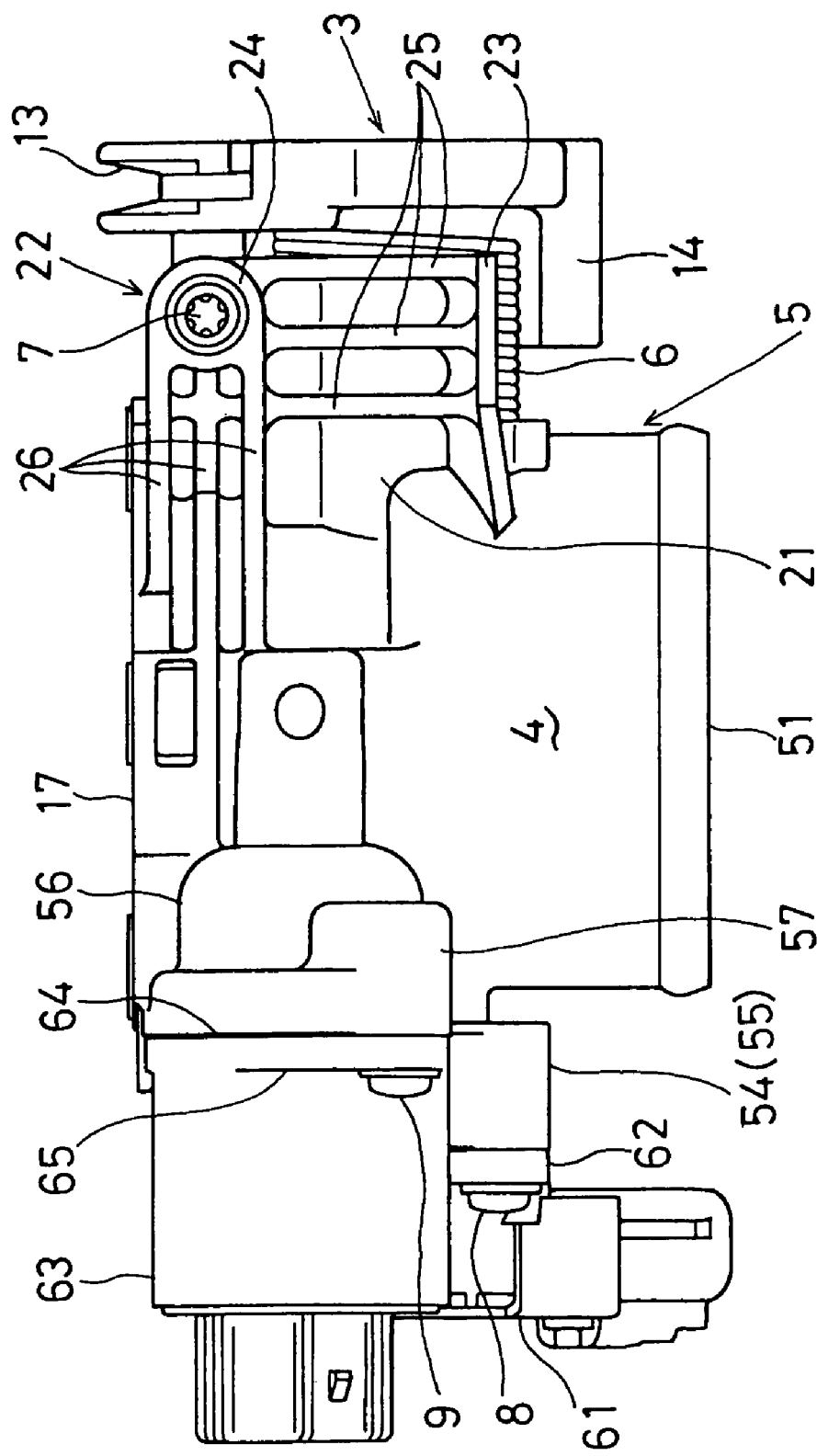
FIG. 12 is a top view of a throttle valve system according to a sixth embodiment of the present invention.

The sixth embodiment of the present invention will be described with reference to FIGS. 12 and 13. In this embodiment, a bore portion 4 of a throttle housing 5 has a double-pipe structure. In this structure, a cylindrical outer bore portion 51 is disposed outside of a cylindrical inner bore portion 52, and moreover the axis of the inner bore portion 51 is biased in the vertical direction with respect to that of the outer bore portion 51. The inner bore portion 52 has an air passage in its inside, through which the air flows into the engine. In the substantial center of the inner bore portion 52 in its axial direction, a throttle valve 1 and the throttle shaft 2 are rotatably installed. A cylindrical space is formed between the outer bore portion 51 and the inner bore portion 52. The cylindrical space is fully separated by a separation wall 53 in its axial center.

Figure 13:
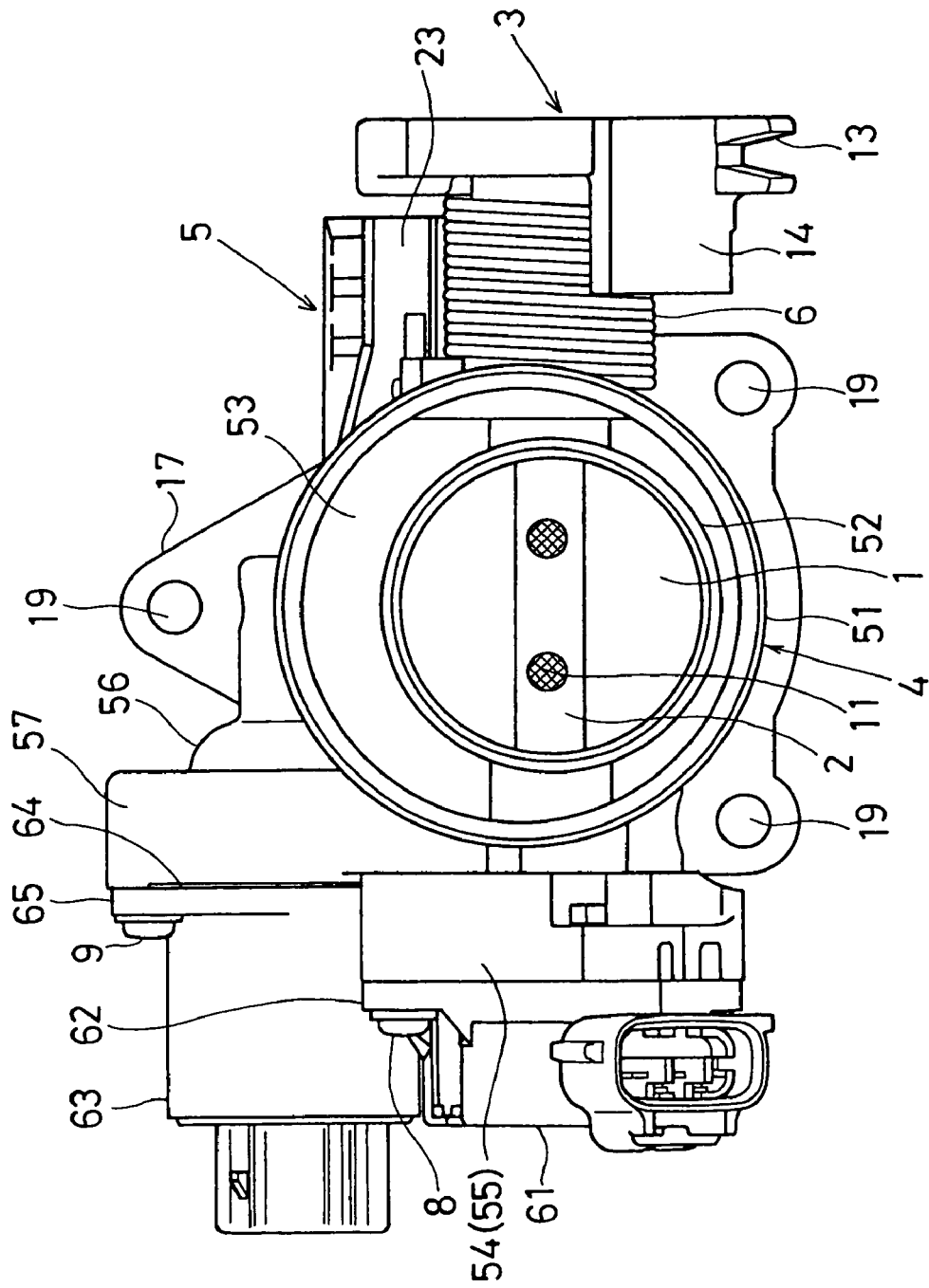
FIG. 13 is a front elevational view of the throttle valve system according to the sixth embodiment of the present invention.

A sensor housing 54 is formed integrally with the throttle housing 5 on the left side of the bore portion 4 in FIG. 13. The sensor housing 54 houses components of a throttle position sensor (e.g., a rotor, etc.) for detecting rotation degrees of the throttle valve 1 and the throttle shaft 2. Moreover, a throttle position sensor main body 61, including a sensing element (not shown) and an external connection terminal (not shown), is fastened to the sensor housing 54 through the use of a fastening screw 8.

The throttle position sensor main body 61 has a boss shaped projection 62 projecting from it outer periphery. The projection 62 has a through hole (not shown) to be screwed with the fastening screw 8. The sensor housing 54 has a projection 55, the position of which corresponds to that of the projection 62. The projection 55 has a non-threaded receiving hole (not shown), into which the fastening screw 8 is guided when a male-threaded portion (not shown) of the fastening screw 8 is screwed thereinto. In addition, when the fastening screw 8 is screwed into the receiving hole, female threads are formed there.

Moreover, a bypass-passage forming portion 56, having a bypass passage (not shown) in its inside, is formed integrally with the outer bore portion 51. The bypass passage is an air passage bypassing the throttle valve 1. In the bypass passage, an idle speed control valve (not shown) is installed. This valve is controlled by a stepping motor 63, and thereby the amount of air bypassing the throttle valve 1 is controlled so as to control the idle rotation speed of the engine. The stepping motor 63 is fastened to the bypass-passage forming portion 56 through the use of an attachment flange 64 of the stepping motor 63 and a fastening screw 9.

The attachment flange 64 has a boss-shaped projection 65, which has a through hole (not shown) to be penetrated by the fastening screw 9. The bypass-passage forming portion 56 has a boss-shaped projection 57. The projection 55 has a non-threaded receiving hole (not shown), into which the fastening screw 9 is guided when a male-threaded portion (not shown) of the fastening screw 9 is screwed thereinto. In addition, when the fastening screw 9 is screwed into the receiving hole, female threads are formed there.

In this embodiment, the crack-preventive screw-fastening structure according to any one of the first to fifth embodiments of the present invention is employed for the fastening screws 8, 9 and the projections 55, 57. For example, before the fastening screws 8, 9 are respectively screwed into the receiving holes of the projections 55, 57, the non-hardened adhesive is applied to the male-threaded portions of the fastening screws 8, 9 or to the inner surfaces of the receiving holes formed in the projections 55, 57. Thus, the adhesive can prevents the projections 55, 57 from being cracked.

In this embodiment, the cracking prevention structure is applied to the throttle valve system described above. However, it may be applied to throttle valve systems other than the above throttle valve system.

Other Embodiments

In the above embodiments, the present invention is applied to the throttle valve system having a structure in which the depressed degree of the accelerator pedal is mechanically transmitted to the throttle lever and the throttle shaft 2, and thereby the throttle valve 1 is driven. However, the present invention may be applied to a throttle valve system having a structure in which valve gears are rotationally driven by a motor through a reduction gear system. In this case, the valve gear may be fastened to one end of the throttle shaft 2 through the use of a screw, or the valve gear may be formed integrally with one end of the throttle shaft 2.

Moreover, the tapping screw 7 is attached to the full-close stopper 24. However, the tapping screw 7 may be attached to the full-open stopper 23. In this case, the fully opened degree of the throttle valve 1 can be adjusted by the tapping screw 7. Moreover, the throttle housing 5 is integrally made of a heat resisting resin. However, a portion in which the tapping screw 7 is screwed may be made of resin. Moreover, the present invention is applied to the throttle housing 5 of the throttle valve system. However, the present invention may be applied for fastening a certain device (e.g., a compressor, a blower, a valve, etc.) to a housing of a particular system.

The present invention should not be limited to the embodiments previously discussed and shown in the figures, but may be implemented in various ways without departing from the spirit of the invention.

What is claimed is:

1. A screw fastening structure comprising:
   a screw having a male-threaded portion and a screw head, which is positioned at an end of the screw in opposition to an engaging side of the screw; and
   a housing including a resinous portion to be threadably engaged with the male-threaded portion; and
   an adhesive permeating between the male-threaded portion and the resinous portion, wherein;
   the resinous portion has a round through hole for guiding the male-threaded portion to be engaged therewith, said through hole extending completely through said resinous portion;
   the resinous portion has a clearance inlet hole defined therein around an inlet of and concentrically with the through hole; and
   an inner diameter of the clearance inlet hole is larger than an outer diameter of the male-threaded portion.

2. The screw fastening structure according to claim 1, wherein the clearance inlet hole has a tapering shape, where the inner diameter of the clearance inlet hole becomes smaller in a screwing direction of the screw.

3. A screw fastening structure comprising:
   a screw having a male-threaded portion and a screw head, which is positioned at an end of the screw in opposition to an engaging side of the screw;
   a housing including a resinous portion having a through hole to be threadably engaged with the male-threaded; and
   an adhesive permeating between the male-threaded portion and the resinous portion, wherein the length of the male-threaded portion is shorter than the length of the resinous portion through hole so that the male-threaded portion does not project from the outlet of the resinous portion through hole when engaged therewith.

4. A screw fastening structure comprising:
   a screw having a male-threaded portion;
   a housing including a resinous portion to be threadably engaged with the male-threaded portion; and
   an adhesive permeating between the male-threaded portion and the resinous portion, wherein the resinous portion has a round through hole for guiding the male-threaded portion to be engaged therewith, said through hole extending completely through said resinous portion, and the resinous portion has a clearance portion defined therein around an outlet of and concentrically with the resinous portion through hole.

5. The screw fastening structure according to claim 4, wherein the clearance portion is a clearance outlet hole, the inner diameter of which is larger than the outer diameter of the male-threaded portion.

6. The screw fastening structure according to claim 4, wherein the clearance portion is formed by a chamfered outlet portion.

7. A screw fastening structure comprising:
   a screw having a male-threaded portion;
   a housing including a resinous portion to be threadably engaged with the male-threaded portion; and
   an adhesive permeating between the male-threaded portion and the resinous portion, wherein the housing is a throttle housing, which is used for a throttle valve system and has a bore portion in which a throttle valve is rotatably installed;
   the resinous portion is a boss-shaped portion that projects from an outer wall of the throttle housing; and
   the screw is a tapping screw for controlling one of an opened degree and a closed degree of the throttle valve.

8. The screw fastening structure according to claim 7, wherein:
   the resinous portion has a round through hole for guiding the male-threaded portion to be engaged therewith;
   the adhesive is applied in its non-hardened state to the inner surface of the through hole before the male-threaded portion is threadably engaged with the inner surface of the through hole; and the adhesive is hardened after the male-threaded portion is threadably engaged with the through hole.

9. A screw fastening structure comprising:

a screw having a male-threaded portion;

a housing including a resinous portion to be threadably engaged with the male-threaded portion; and an adhesive permeating between the male-threaded portion and the resinous portion, wherein:

the housing is a throttle housing, which is used for a throttle valve system and has a bore portion in which a throttle valve is rotatably installed;

the resinous portion is a boss-shaped portion that projects from an outer wall of the throttle housing; and the screw is a fastening screw for fastening an attachment member, having a through hole, to the boss-shaped portion.

10. A screw fastening structure comprising:

a screw having a male-threaded portion;

a housing including a resinous portion to be threadably engaged with the male-threaded portion; and an adhesive permeating between the male-threaded portion and the resinous portion, wherein the male-threaded portion has a non-circular shape in its cross-section that is perpendicular to an axial, screw advancing direction of the male-threaded portion, wherein the male-threaded portion has a non-circular shape in plan view.

11. The screw fastening structure according to claim 10, wherein the non-circular shape is a substantially triangle shape.

12. The screw fastening structure according to claim 9, wherein:

the resinous portion has a round through hole for guiding the male-threaded portion to be engaged therewith;

the adhesive is applied in its non-hardened state to the inner surface of the through hole before the male-threaded portion is threadably engaged with the inner surface of the through hole; and the adhesive is hardened after the male-threaded portion is threadably engaged with the through hole.

13. The screw fastening structure according to claim 10, wherein:

the resinous portion has a round through hole for guiding the male-threaded portion to be engaged therewith, said through hole extending completely through said resinous portion;

the adhesive is applied in its non-hardened state to the inner surface of the through hole before the male-threaded portion is threadably engaged with the inner surface of the through hole; and the adhesive is hardened after the male-threaded portion is threadably engaged with the through hole.

14. The screw fastening structure according to claim 3, wherein the screw has a non-threaded portion, which is positioned at an end of the screw in opposition to the side of the screw head, the non-threaded portion has non male threads, and the non-threaded portion projects from the outlet of the through hole.

15. The screw fastening structure according to claim 4, wherein the male-threaded portion has a length that is longer than a length of the through hole in an axial, screw advancing direction.

* * * * *